(12) United States Patent
Sung (10) Patent No.: US 7,672,344 B2
(45) Date of Patent: Mar. 2, 2010

(54) MULTI-LASER SYSTEM

(75) Inventor: Kyu Dong Sung, Seoul (KR)

(73) Assignee: EO Technics Co., Ltd., Kyungki-Do (KR)

( * ) Notice: Subject to any disclaimer, the term of this patent is extended or adjusted under 35 U.S.C. 154(b) by 11 days.

(21) Appl. No.: 12/062,848

(22) Filed: Apr. 4, 2008

(65) Prior Publication Data

US 2008/0279232 A1    Nov. 13, 2008

(30) Foreign Application Priority Data

May 9, 2007    (KR) .................. 10-2007-0045105

(51) Int. Cl.
*H01S 3/10*    (2006.01)
(52) U.S. Cl. .................. 372/24; 372/20; 372/23
(58) Field of Classification Search .................. 372/24, 372/20
See application file for complete search history.

(56) References Cited

U.S. PATENT DOCUMENTS

| | | | |
|---|---|---|---|
| 5,892,611 A | 4/1999 | Iizuka | |
| 2003/0021307 A1* | 1/2003 | Yamazaki | 372/24 |
| 2004/0155018 A1 | 8/2004 | Umetsu et al. | |

FOREIGN PATENT DOCUMENTS

| | | |
|---|---|---|
| EP | 0749047 A | 12/1996 |
| EP | 0859261 A | 8/1998 |
| EP | 0884128 A | 12/1998 |
| JP | 02134259 A | 5/1990 |
| KR | 10-2006-0022982 | 3/2006 |
| KR | 10-2007-0042293 | 4/2007 |
| KR | 100709171 B1 | 4/2007 |

OTHER PUBLICATIONS

Korean Office Action issued in 10-2007-0045105 dated Mar. 31, 2008.
European Search Report of European Application No. EP 08251289 dated Aug. 5, 2008.
WO 2007/055452 as downloaded from World Intellectual Property Organization of Nov. 20, 2008 http://www.wipo.int/pctdb/en/wo.jsp?IA=KR2006002517&WO=2007055452@DISPLA... (English equivilant of KR100709171B1).

* cited by examiner

*Primary Examiner*—Dung T Nguyen
(74) *Attorney, Agent, or Firm*—Buchanan Ingersoll & Rooney PC (57) ABSTRACT

A multi-laser system including a first laser oscillator for emitting a first laser beam, a second laser oscillator for emitting a second laser beam, a first scanner pair for receiving the first laser beam emitted by the first laser oscillator and deflecting the incident first laser beam to a desired location on a substrate to be processed, a second scanner pair for receiving the second laser beam emitted by the second laser oscillator and deflecting the incident second laser beam to a desired location on the substrate to be processed, and a scan lens for receiving laser beams that have been deflected from the first and second scanner pairs, focusing the received laser beams to spots having predetermined diameters so as to radiate the spots on the substrate.

8 Claims, 7 Drawing Sheets

MULTI-LASER SYSTEM

CROSS-REFERENCE TO RELATED PATENT APPLICATION

This application claims the benefit of Korean Patent Application No. 10-2007-0045105, filed on May 9, 2007, in the Korean Intellectual Property Office, the disclosure of which is incorporated herein in its entirety by reference.

BACKGROUND OF THE INVENTION

1. Field of the Invention

The present invention relates to a multi-laser system, and more particularly, to a multi-laser system capable of selecting a laser beam, from among various kinds of laser beams emitted from a pair of laser oscillators, most suitable for each of the materials of a substrate to be processed.

2. Description of the Related Art

Typically, laser systems transmit a laser beam emitted from a laser oscillator by using a laser beam transport means (for example, a reflection mirror, a beam expander, a scanner pair, a scan lens, etc.) and then perform an operation, such as drilling, marking, or cutting, by projecting the laser beam onto a substrate that is to be processed.

Figure 1:
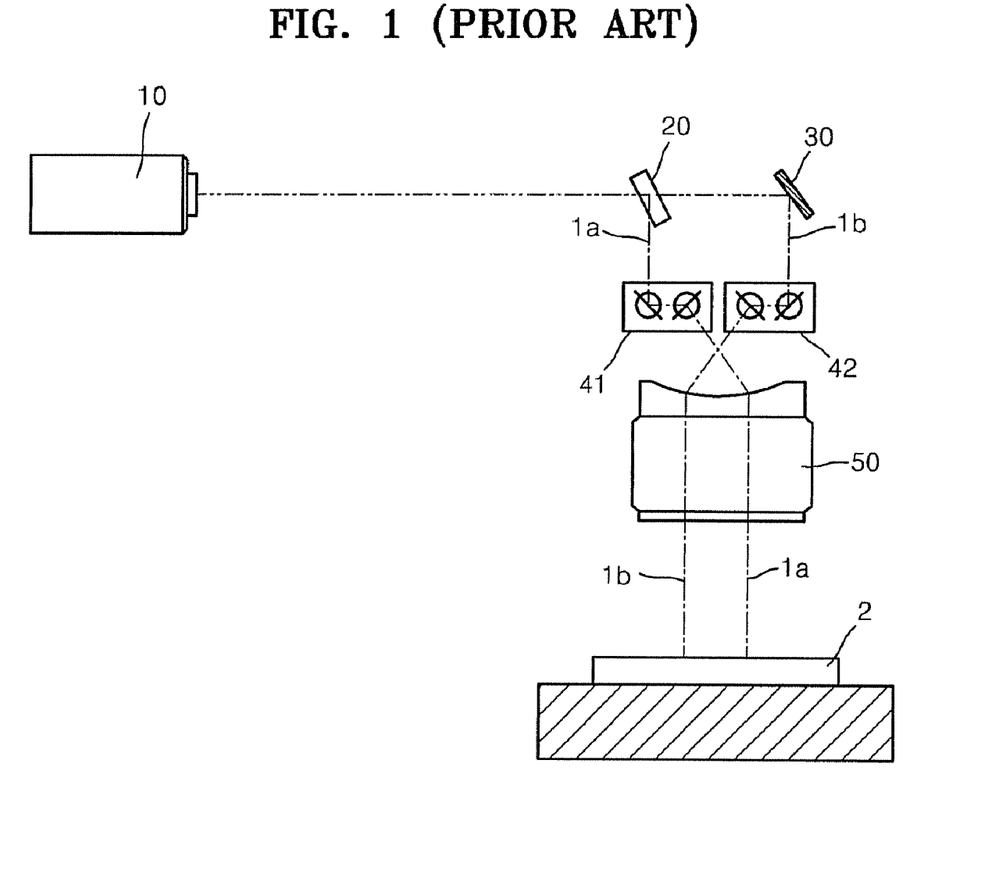
FIG. 1 is a schematic diagram of a conventional laser system.
Figure 2:
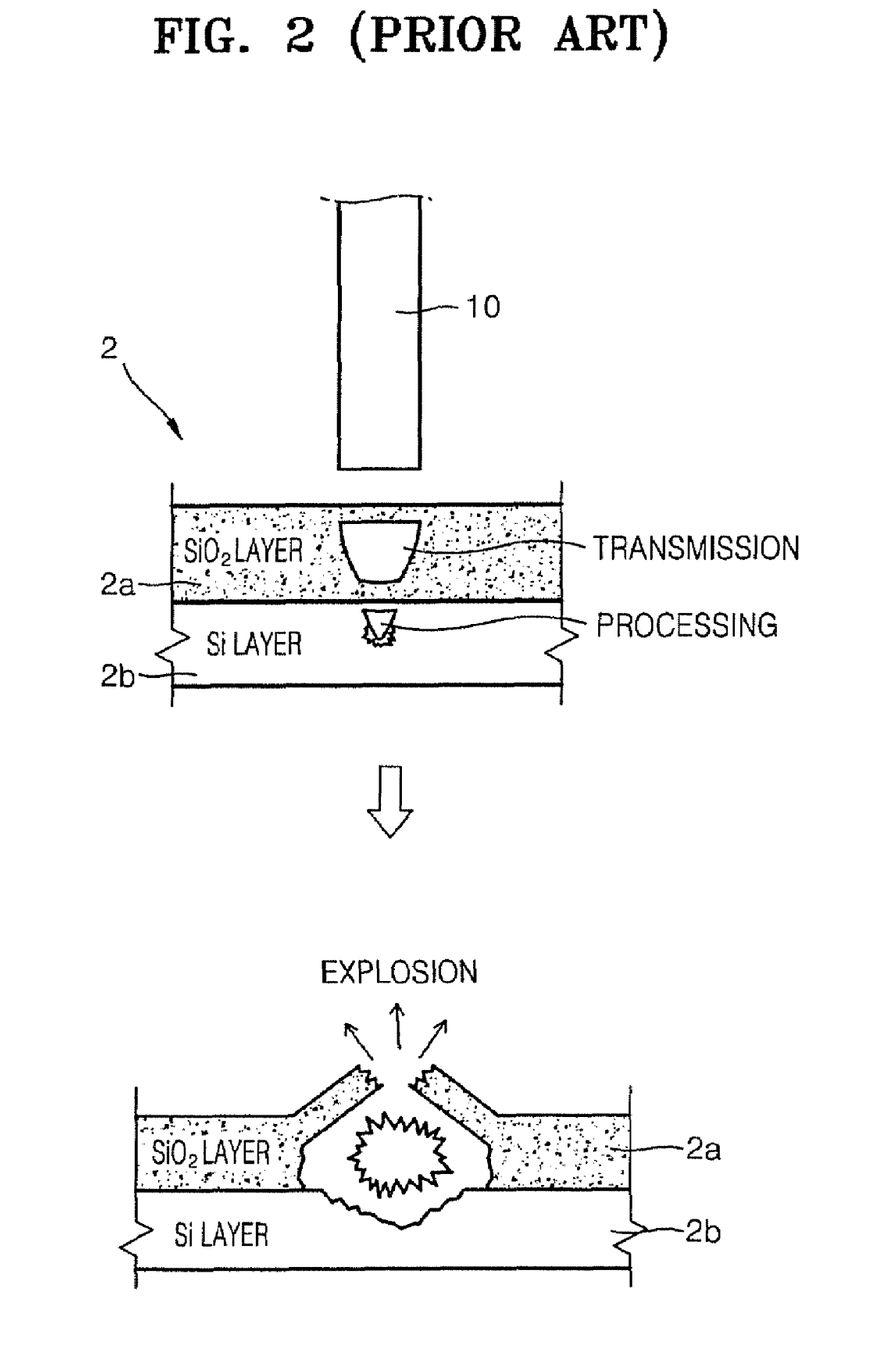
FIG. 2 illustrates a cross-section of a substrate processed using the conventional laser system illustrated in FIG. 1.

FIG. 1 is a schematic diagram of a conventional laser system, and FIG. 2 illustrates a cross-section of a substrate 2 processed using the conventional laser system illustrated in FIG. 1.

Referring to FIGS. 1 and 2, in the conventional laser system, 50% of a laser beam emitted from a laser oscillator 10 and incident upon a beam splitter 20 passes through the beam splitter 20, and the other 50% thereof is reflected by the beam splitter 20. The laser beam reflected by the beam splitter 20 passes through a scanner pair 41 and a scan lens 50 along a first path 1a and is radiated on a substrate 2, and the laser beam that penetrated the beam splitter 20 is incident on a reflection mirror 30, passes through a scanner pair 42, and the scan lens 50 along a second path 1b and is radiated on the substrate 2.

During a processing operation based on such a conventional laser system, absorptance, which depends on wavelength of the laser beam, of the materials of a substrate to be processed should be first considered. The substrate, formed of different materials, shows different reactions in view of a photo-thermal effect, a photo-chemical effect, and a photo-mechanical effect according to the wavelength of projected laser beams. Accordingly, a selection of laser beams that allow for a most suitable processing according to the materials of the substrate is important in performing a good-quality process.

For example, as shown in FIG. 2, when the substrate 2, which is a stack of a SiO$_2$ layer 2a on a Si layer 2b, is processed using a laser beam emitted from the laser oscillator 10 and having a wavelength in an ultraviolet (UV) ray band, the quality of the process may not be good because the SiO$_2$ layer 2a and the Si layer 2b have different optical characteristics with respect to the wavelength of the laser beam. In other words, since the SiO$_2$ layer 2a transmits most of incident UV light and the Si layer 2b absorbs a high portion of the UV light, the laser beam in the UV ray band and incident upon a top surface of the substrate 2, passes through the SiO$_2$ layer 2a and is absorbed by a top surface of the Si layer 2b. In this way, the substrate 2 is processed. Accordingly, heat and gas generated due to processing are accumulated at a boundary between the SiO$_2$ layer 2a and the Si layer 2b, and an explosion occurs due to the accumulated heat and gas. This leads to a phenomenon where the quality of a processing operation using laser degrades.

With recent trends toward a rapid development in the semiconductor industry and an increase in the demand of a new field, a case where a substrate formed of a new material not used before needs to be processed or a substrate formed by stacking materials used before needs to be processed is increasing. However, as described above, when two or more materials needs to be processed using a laser having a single characteristic, such as, a fixed wavelength, good-quality processing is not guaranteed due to a difference between the optical characteristics of the two or more materials.

SUMMARY OF THE INVENTION

The present invention provides a multi-laser system having an improved structure such that a most suitable laser beam for each of the materials of a substrate to be processed is selected from among laser beams so as to perform a laser processing operation by using the selected laser beam. The laser beams have different characteristics from each other and the materials are different from each other.

According to an aspect of the present invention, there is provided a multi-laser system comprising: a first laser oscillator emitting a first laser beam; a second laser oscillator emitting a second laser beam; a first scanner pair receiving the first laser beam emitted by the first laser oscillator and deflecting the incident first laser beam to a desired location on a substrate to be processed; a second scanner pair receiving the second laser beam emitted by the second laser oscillator and deflecting the incident second laser beam to a desired location on the substrate to be processed; and a scan lens receiving laser beams that have been deflected from the first and second scanner pairs, focusing the received laser beams to spots having predetermined diameters so as to radiate the spots on the substrate.

According to another aspect of the present invention, there is provided a multi-laser system comprising: a first laser oscillator emitting a first laser beam; a second laser oscillator emitting a second laser beam; a first scanner pair receiving the first laser beam emitted by the first laser oscillator and deflecting the incident first laser beam to a desired location on a substrate to be processed; a second scanner pair receiving the second laser beam emitted by the second laser oscillator and deflecting the incident second laser beam to a desired location on the substrate to be processed; a scan lens receiving laser beams that have been deflected from the first and second scanner pairs, focusing the received laser beams to spots having predetermined diameters so as to radiate the spots on the substrate; a first dividing unit installed between the first laser oscillator and the first scanner pair, receiving the first laser beam and dividing the received first laser beam into two first laser beams so that the two first laser beams can proceed respectively along two first paths; and a second dividing unit installed between the second laser oscillator and the second scanner pair, receiving the second laser beam and dividing the received second laser beam into two second laser beams so that the two second laser beams can proceed respectively along two second paths, wherein the first scanner pair comprises two scanners corresponding to the two first laser beams proceeding along the two first paths, and the second scanner pair comprises two scanners corresponding to the two second laser beams proceeding along the two second paths.

In the latter embodiment of the present invention, each of the first dividing unit and the second dividing unit may comprise a beam splitter that reflects 50% of an incident laser beam and transmits the rest 50%.

In the above-described embodiments of the present invention, the first laser oscillator and the second laser oscillator may emit laser beams having different wavelengths from one another.

In the above-described embodiments of the present invention, the first laser oscillator and the second laser oscillator may emit laser beams having different pulse widths from one another.

Each of the multi-laser systems according to the above-described embodiments of the present invention may further comprise shuttle units each comprising a beam blocking unit for entirely blocking an incident laser beam, a beam transmitting unit for entirely allowing an incident laser beam to be transmitted, and a transport means for changing a location of one of the beam blocking unit and the beam transmitting unit so that the laser beam is incident upon one of the beam blocking unit and the beam transmitting unit.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 3:
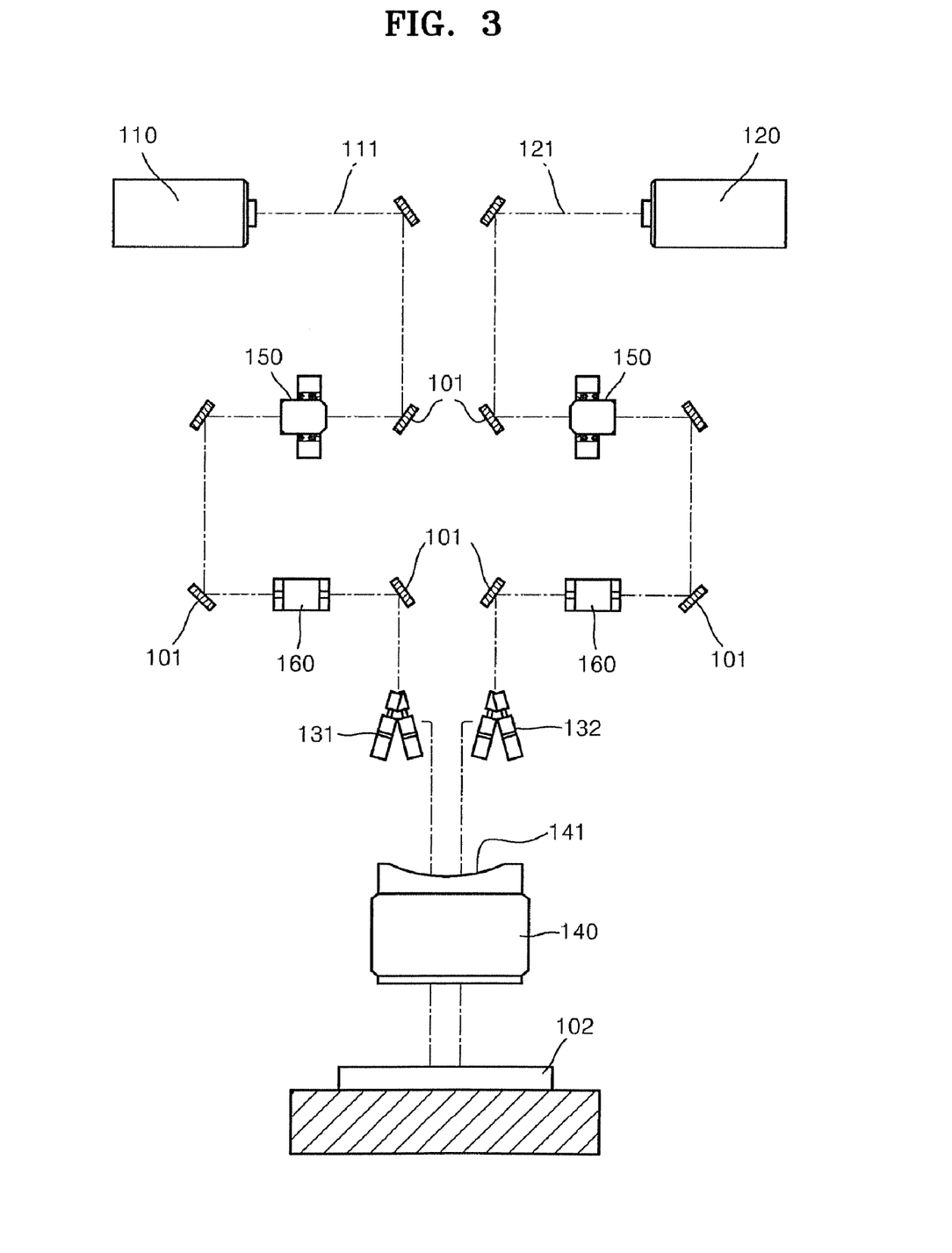
FIG. 3 is a schematic diagram of a multi-laser system according to an embodiment of the present invention.
Figure 4:
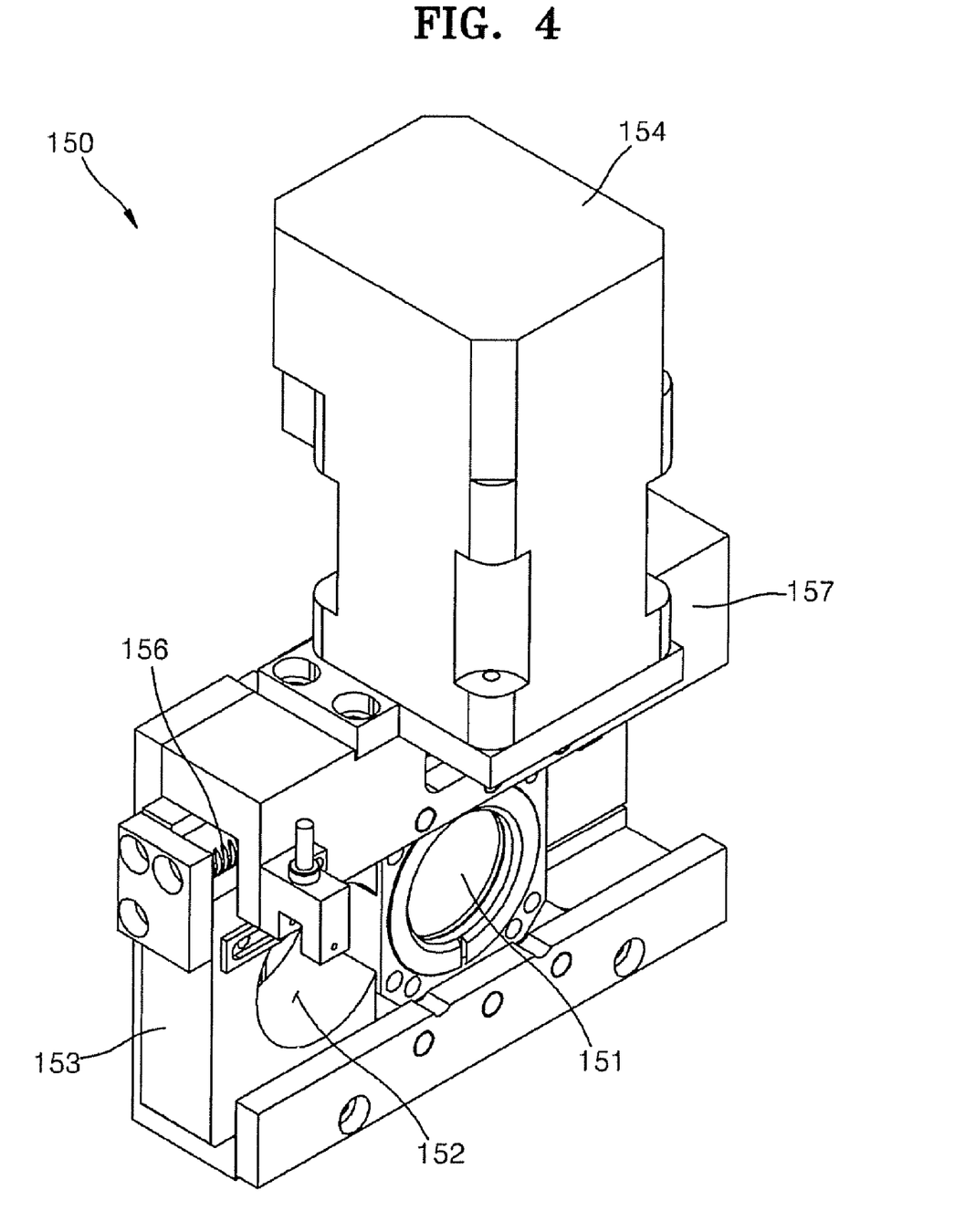
FIG. 4 is a perspective view of one of a plurality of shuttle units of the multi-laser system illustrated in FIG. 3.
Figure 5:
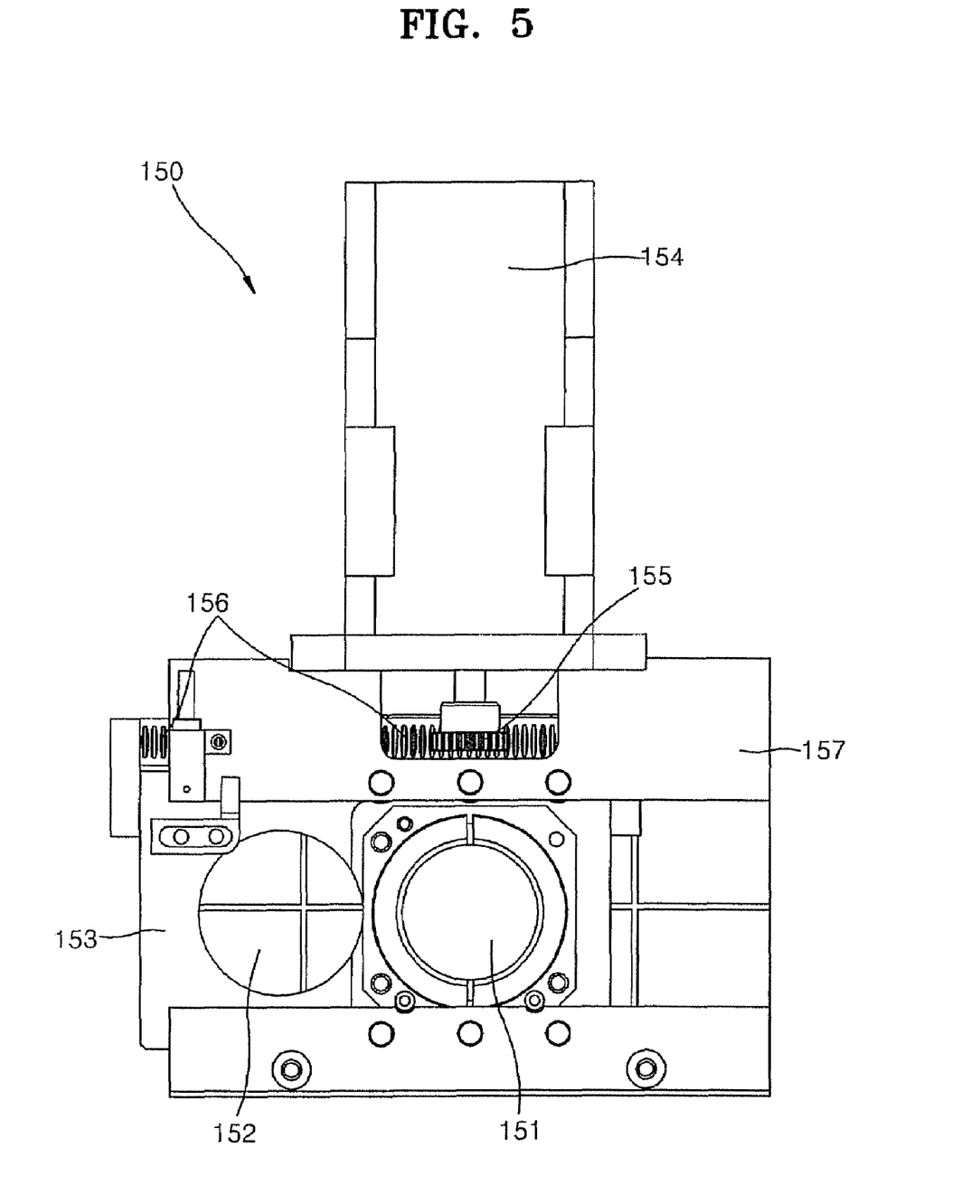
FIG. 5 is a front view of the shuttle unit illustrated in FIG. 4.
Figure 6:
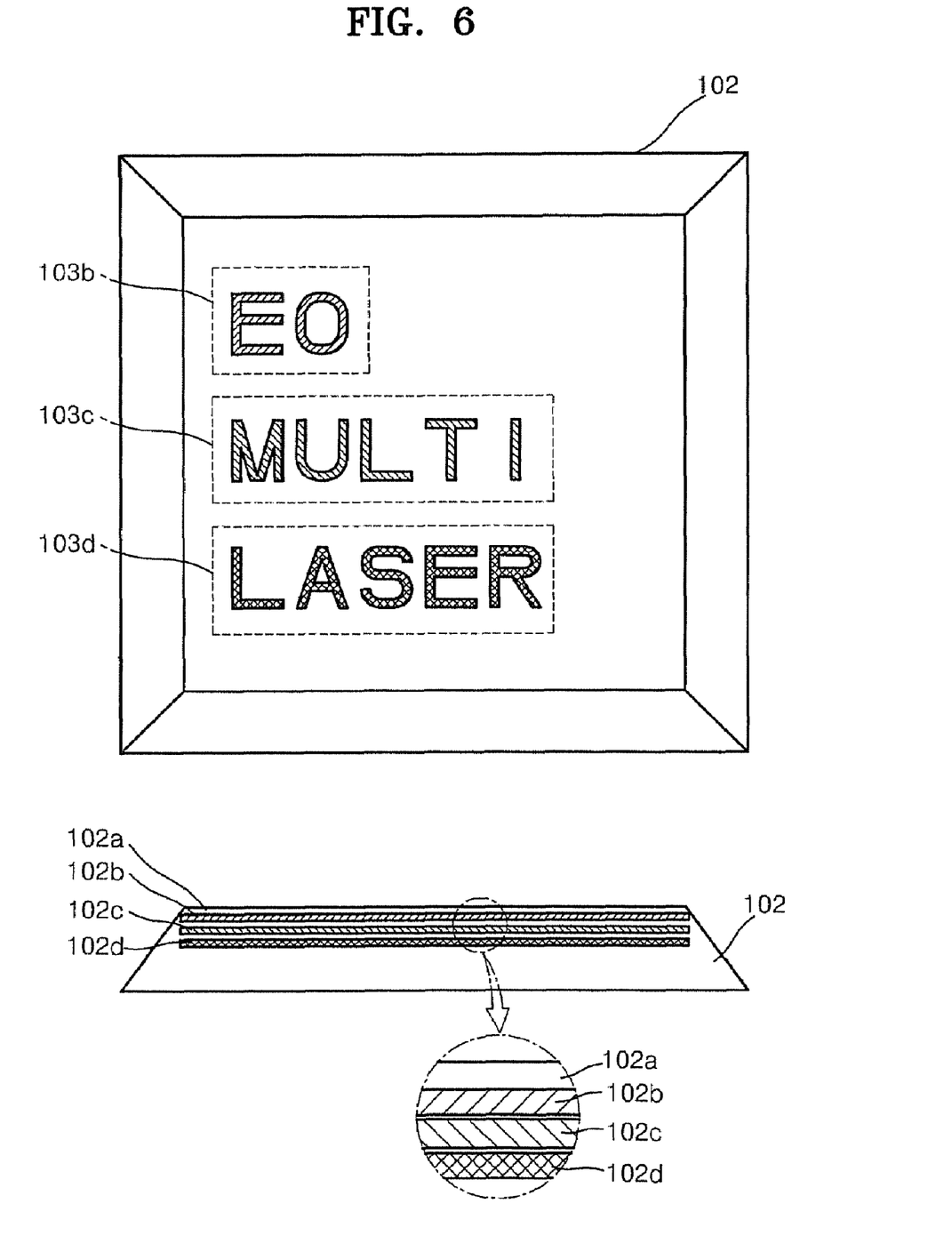
FIG. 6 illustrates a substrate processed using the multi-laser system illustrated in FIG. 3.

FIG. 3 is a schematic diagram of a multi-laser system according to an embodiment of the present invention. FIG. 4 is a perspective view of one of a plurality of shuttle units 150 of the multi-laser system illustrated in FIG. 3. FIG. 5 is a front view of the shuttle unit 150 illustrated in FIG. 4. FIG. 6 illustrates a substrate 102 processed using the multi-laser system illustrated in FIG. 3.

Referring to FIGS. 3 through 6, the multi-laser system according to the current embodiment includes laser beams 111 and 121 having different characteristics from each other and a single scan lens 140 for focusing the laser beams, in order to improve the quality of a laser processing operation with respect to the substrate 102 having a plurality of different material layers. The multi-laser system according to the current embodiment includes a first laser oscillator 110, a second laser oscillator 120, a first scanner pair 131, a second scanner pair 132, the single scan lens 140, and the shuttle units 150.

The first and second laser oscillators 110 and 120 generate laser beams that serve as an energy source of a laser processing operation, more specifically, laser beams 111 and 121, respectively, having different wavelengths from each other. According to the material of the substrate 102 to be processed, the type of laser processing method, or other factors, laser oscillators capable of generating laser beams having wavelengths, from among various wavelengths, most suitable for desired processing operations, such as UV light, visible light, and infrared light, may be selected as the laser oscillators 110 and 120.

The first scanner pair 131 and the second scanner pair 132 deflect the incoming laser beams 111 and 121, respectively, to desired locations on the substrate 102. Typically, the first and second scanner pairs 131 and 132 may include X-axis galvanometer scanners for controlling the incoming laser beams 111 and 121 in an X-axis direction, respectively, and Y-axis galvanometer scanners for controlling the incoming laser beams 111 and 121 in a Y-axis direction, respectively. Each of the first and second scanner pairs 131 and 132 denotes a combination of X-axis galvanometer scanner and Y-axis galvanometer scanner. In the present embodiment, the first scanner pair 131 corresponds to the laser beam 111 emitted by the first laser oscillator 110, and the second scanner pair 132 corresponds to the laser beam 121 emitted by the second laser oscillator 120.

The single scan lens 140 focuses the laser beams 111 and 121 received from the first and second scanner pairs 131 and 132 so as to form a spot, having a predetermined diameter, and emits the spot on the substrate 102 that is to be processed. The multi-laser system according to the present embodiment is configured such that the laser beams 111 and 121 having different wavelengths from each other are both incident upon an incidence surface 141 of the single scan lens 140. In general, an f-theta lens may be used as the single scan lens 140.

The shuttle units 150 either block or proceed the propagations of the laser beams 111 and 121 along their respective beam paths, and each include a beam blocking unit 151, a beam transmitting unit 152, and a transport means. The shuttle units 150 are located in between the first laser oscillator 110 and the first scanner pair 131 and in between the second laser oscillator 120 and the second scanner pair 132, on the beam paths of the laser beams 111 and 121.

The beam blocking units 151 entirely block the laser beams 111 and 121 so that the laser beams 111 and 121 are prevented from being transmitted to sides opposite to incidence sides of the beam blocking units 151. In the present embodiment, anodized black aluminum plates are used as the beam blocking units 151 in order to increase the absorptances of the laser beams 111 and 121.

The beam transmitting units 152 allow the incident laser beams 111 and 121 to be transmitted to the sides opposite to incidence sides of the beam transmitting units 152. In the present embodiment, members having through holes formed at their centers serve as the beam transmitting units 152.

The transport means change the locations of the beam blocking units 151 or the beam transmitting units 152 so that the laser beams 111 and 121 incident upon the shuttle units 150 can propagate toward either the beam blocking units 151 or the beam transmitting units 152. Each of the transport means includes a support bracket 153, a base 157, a driving source, a pinion member 155, and a racking member 156.

The support bracket 153 supports the beam blocking unit 151 and the beam transmitting unit 152. The driving source provides power for horizontally reciprocating the support bracket 153. A motor 154 may be often used as the driving source. The support bracket 153 is coupled to the base 157 so as to horizontally move, and the motor 154 is fixed to the base 157. The pinion member 155 is coaxially coupled to a rotational shaft of the motor 154, and interlocks with the racking member 156 fixed to the support bracket 153. When the motor 154 and the pinion member 155 rotate in a forward or backward direction, the racking member 156 interlocked with the pinion member 155 rectilinearly moves, and thus, the support bracket 153 to which the racking member 156 is fixed moves together with the racking member 156. Accordingly, the locations of the beam blocking unit 151 and the beam transmitting unit 152 can be changed.

The control of the locations of the beam blocking unit 151 and the beam transmitting unit 152 may enable a laser processing operation to be performed using a laser beam selected from among the laser beams 111 and 121 having different characteristics from each other.

The laser beams 111 and 121 that were allowed to be transmitted to the sides opposite to incidence sides of the beam transmitting units 152 of the shuttle units 150 reflect from reflection mirrors 101 and are incident upon beam expanders 160. The beam expanders 160 may control the diameters of the laser beams 111 and 121, and the single scan lens 140 may change the focal distances of the laser beams 111 and 121 and the size of a spot according to the diameters of the laser beams 111 and 121. Therefore, the multi-laser system according to the current embodiment can deal with various types of processing operations and various types of substrates 102. The beam expanders 160 are installed at upstream sides of the first and second scanner pairs 131 and 132, respectively, and correspond to the laser beams 111 and 121, respectively, having different wavelengths from each other.

The substrate 102 processed using the multi-laser system of FIG. 3 will now be described with reference to FIG. 6. For example, the substrate 102, which is to be processed, has four different material layers coated thereon, and is processed so that desired characters or figures are marked on the top surfaces of the material layers by using laser beams.

Referring to FIG. 6, a first material layer 102a, a second material layer 102b, a third material layer 102c, and a fourth material layer 102d are sequentially stacked on the top surface of the substrate 102. Since the first material layer 102a, the second material layer 102b, the third material layer 102c, and the fourth material layer 102d have different optical characteristics from each other, the laser beam absorptances thereof are different from one another and also vary according to parameters of a laser beam, such as the wavelength, frequency, and pulse width of the laser beam.

First, the first laser oscillator 110 controls the parameters of the laser beam 111, such as, the wavelength, frequency, and pulse width thereof, to be suitable for processing the first material layer 102a, and radiates the controlled laser beam 111 (hereinafter, referred to as 'a first laser beam under a first condition') onto the first material layer 102a. For example, since a material layer on which an "EO" character 103b is desired to be marked is the second material layer 102b, an appropriate portion is removed from the first material layer 102a by using the first laser beam under the first condition so that the "EO" character 103b can be marked on the second material layer 102b.

Thereafter, the second laser oscillator 120 controls the parameters of the laser beam 121, such as, the wavelength, frequency, and pulse width thereof, to be suitable for processing the second material layer 102b, and radiates the controlled laser beam 121 (hereinafter, referred to as 'a second laser beam under a first condition') onto the second material layer 102b, thereby marking the "EO" character 103b on the second material layer 102b. Alternatively, without the process of removing the first material layer 102a by using the first laser beam under the first condition, the "EO" character 103b may be marked on the second material layer 102b by controlling the parameters of the second laser beam under the first condition so that the second laser beam passes through the first material layer 102a and is entirely absorbed by the second material layer 102b and thus radiating the controlled second laser beam directly onto the second material layer 102b.

The first laser oscillator 110 controls the parameters of the laser beam 111, such as, the wavelength, frequency, and pulse width thereof, so that the laser beam 111 passes through the first and second material layers 102a and 102b and is entirely absorbed by the third material layer 102c so as to be suitable for processing the third material layer 102c, and radiates the controlled laser beam 111 (hereinafter, referred to as 'a first laser beam under a second condition') onto the third material layer 102c. Thus, a "MULTI" character 103c can be marked on the top surface of the third material layer 102c by using the first laser beam under the second. Similarly, the second laser oscillator 120 controls the parameters of the laser beam 121, such as, the wavelength, frequency, and pulse width thereof, to be suitable for processing the fourth material layer 102d, and radiates the controlled laser beam 121 (hereinafter, referred to as a second laser beam under a second condition) onto the fourth material layer 102d, thereby marking a "LASER" character 103d on the top surface of the fourth material layer 102d.

As described above, since the multi-laser system according to the current embodiment includes a pair of laser oscillators for emitting laser beams having different characteristics from one another, and a single scan lens for focusing the laser beams, when a substrate having a plurality of materials having different optical characteristics from one another needs to be processed, the substrate does not need to move to suitable systems having single laser oscillators that are different according to the optical characteristics of the materials of the substrate. Therefore, a desired processing can be performed in a single system. In addition, the substrate is processed using laser beams selected to be most suitable for the respective optical characteristics of the materials of the substrate, and thus good processing can be achieved.

In addition, the single multi-laser system according to the current embodiment can perform all processing operations and thus reduce the time required for the processing operations, thereby improving the amount of production per unit time.

Moreover, in the conventional art, a substrate, formed of a plurality of materials, is processed by moving the substrate to suitable systems each having a single layer oscillator, and thus, an expensive vision device for alignment is needed in order to accurately process desired areas of the substrate. However, the multi-laser system according to the current embodiment can perform all of the processing operations and thus can save the costs required to install a device for performing alignment or the like.

Figure 7:
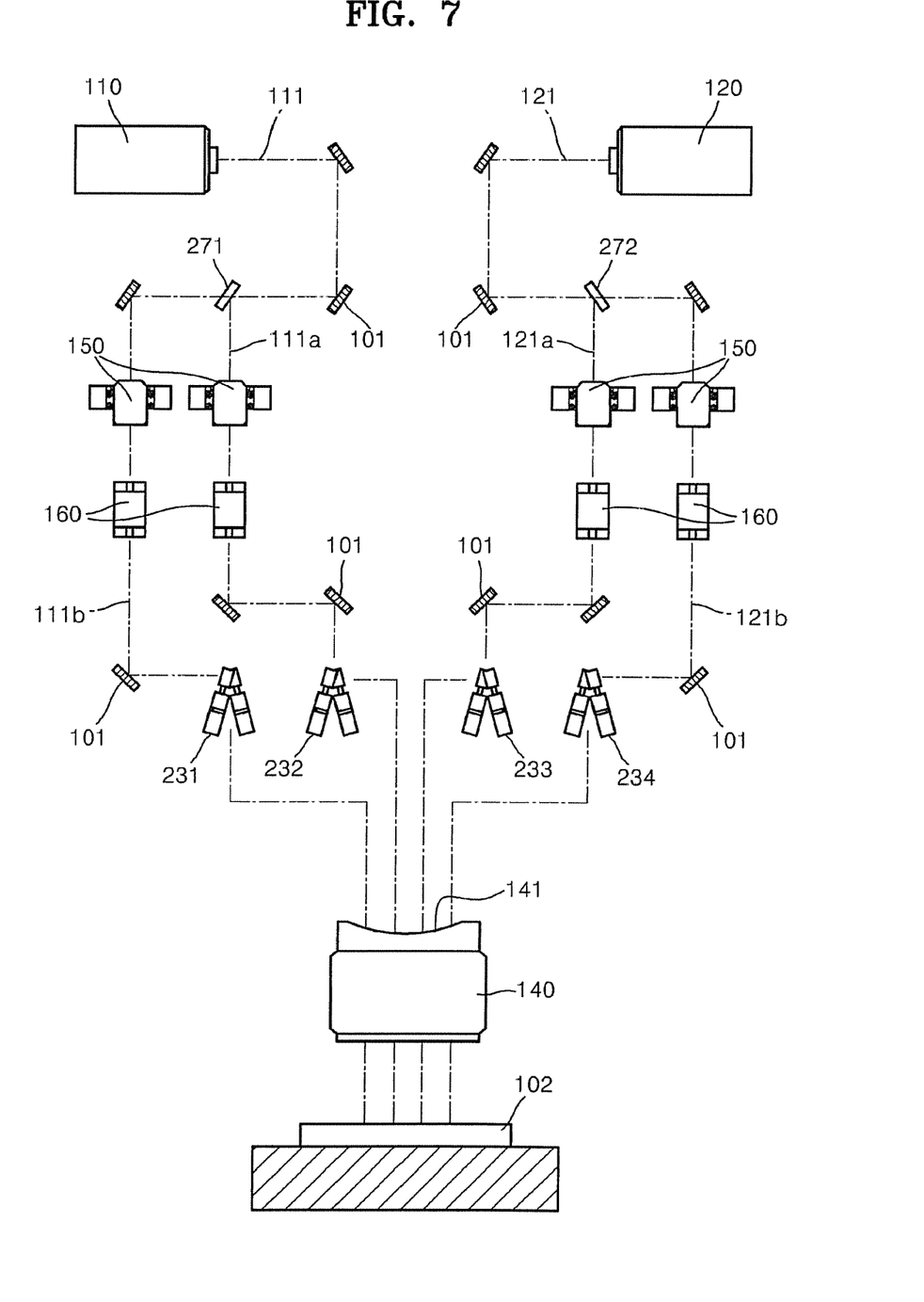
FIG. 7 is a schematic diagram of a multi-laser system according to another embodiment of the present invention.

FIG. 7 is a schematic diagram of a multi-laser system according to another embodiment of the present invention. Elements of FIG. 7, indicated by the same reference numbers as those of FIGS. 3 through 6, have the same structures and functions as those of the corresponding ones in FIGS. 3 through 6, so detailed descriptions thereof will be omitted.

Referring to FIG. 7, the multi-laser system according to the current embodiment is constructed so that the first laser beam 111 emitted from the first laser oscillator 110 is divided into two laser beams, the second laser beam 121 emitted from the second laser oscillator 120 is also divided into two laser beams, and thus, the four laser beams 111 and 121 are radiated on the substrate 102 through the single scan lens 140.

The multi-laser system includes a first dividing unit 271 for dividing the incident first laser beam 111 into the two laser beams, a second dividing unit 272 for dividing the incident second laser beam 121 into the two laser beams, and first, second, third, and fourth scanner pairs 231, 232, 233, and 234 for controlling locations on the substrate 102 on which the four laser beams 111 and 121 are to be radiated.

In the present embodiment, the first dividing unit 271 and the second dividing unit 272 may be beam splitters which reflect 50% of the incident laser beams 111 and 121 toward their incidence sides and transmit the remaining 50% of the incident laser beams 111 and 121 toward sides opposite to their incidence sides.

The first laser beam 111 emitted by the first laser oscillator 110 is divided by the first dividing unit 271, for example, a beam splitter, a portion of the first laser beam 111, which is reflected by the beam splitter, propagates along a first path 111a, on the incidence side of the beam splitter, and the other portion of the first laser beam 111, which is transmitted by the beam splitter, propagates along a first path 111b, on the side opposite to the incidence side of the beam splitter.

Similarly, the second laser beam 121 emitted by the second laser oscillator 120 is divided by the second dividing unit 272, for example, a beam splitter, a portion of the second laser beam 121, which is reflected by the beam splitter, propagates along a second path 121a, on the incidence side of the beam splitter, and the other portion of the second laser beam 121, which is transmitted by the beam splitter, propagates along a second path 121b, on a side opposite to the incidence side of the beam splitter.

The four laser beams 111 and 121 of which paths have been changed are incident upon the four scanner pairs 231, 232, 233, and 234 via the four shuttle units 150 and the four beam expanders 160 and then focused by the single scan lens 140 so as to be projected on the substrate 102 that is to be processed.

The multi-laser system according to the current embodiment also has the same effects as those of the multi-laser system of FIG. 3, and thus, detailed descriptions thereof will be omitted.

In the embodiments of the present invention, a first laser oscillator and a second laser oscillator that emit respective laser beams having different wavelengths from each other are installed. For example, a laser oscillator for emitting a high-power laser beam and a laser oscillator for emitting a low-power laser beam may be installed, or a laser oscillator for emitting a laser beam having a short pulse width and a laser oscillator for emitting a laser beam having a long pulse width may be installed, or a laser oscillator for emitting a laser beam having a high frequency and a laser oscillator for emitting a laser beam having a low frequency may be installed.

While the present invention has been particularly shown and described with reference to exemplary embodiments thereof, it will be understood by one of ordinary skill in the art that various changes in form and details may be made therein without departing from the spirit and scope of the present invention as defined by the following claims.

What is claimed is:

1. A multi-laser system comprising:
a first laser oscillator emitting a first laser beam;
a second laser oscillator emitting a second laser beam;
a first scanner pair receiving the first laser beam emitted by the first laser oscillator and deflecting the incident first laser beam to a desired location on a substrate to be processed;
a second scanner pair receiving the second laser beam emitted by the second laser oscillator and deflecting the incident second laser beam to a desired location on the substrate to be processed; and
a single scan lens receiving laser beams that have been deflected from the first and second scanner pairs, focusing the received laser beams to spots having predetermined diameters so as to radiate spots on the substrate.

2. The multi-laser system of claim 1, wherein the first laser oscillator and the second laser oscillator emit laser beams having different wavelengths from one another.

3. The multi-laser system of claim 1, wherein the first laser oscillator and the second laser oscillator emit laser beams having different pulse widths from one another.

4. A multi-laser system comprising:
a first laser oscillator emitting a first laser beam;
a second laser oscillator emitting a second laser beam;
a first scanner pair receiving the first laser beam emitted by the first laser oscillator and deflecting the incident first laser beam to a desired location on a substrate to be processed;
a second scanner pair receiving the second laser beam emitted by the second laser oscillator and deflecting the incident second laser beam to a desired location on the substrate to be processed;
a scan lens receiving laser beams that have been deflected from the first and second scanner pairs, focusing the received laser beams to spots having predetermined diameters so as to radiate spots on the substrate;
a first dividing unit installed between the first laser oscillator and the first scanner pair, receiving the first laser beam and dividing the received first laser beam into two first laser beams so that the two first laser beams can proceed respectively along two first paths; and
a second dividing unit installed between the second laser oscillator and the second scanner pair, receiving the second laser beam and dividing the received second laser beam into two second laser beams so that the two second laser beams can proceed respectively along two second paths,
wherein the first scanner pair comprises two scanners corresponding to the two first laser beams proceeding along the two first paths, and the second scanner pair comprises two scanners corresponding to the two second laser beams proceeding along the two second paths.

5. The multi-laser system of claim 4, wherein each of the first dividing unit and second dividing unit comprises a beam splitter that reflects 50% of an incident laser beam and transmits the rest 50%.

6. The multi-laser system of claim 4, wherein the first laser oscillator and the second laser oscillator emit laser beams having different wavelengths from one another.

7. The multi-laser system of claim 4, wherein the first laser oscillator and the second laser oscillator emit laser beams having different pulse widths from one another.

8. A multi-laser system comprising:
a first laser oscillator emitting a first laser beam;
a second laser oscillator emitting a second laser beam;
a first scanner pair receiving the first laser beam emitted by the first laser oscillator and deflecting the incident first laser beam to a desired location on a substrate to be processed;
a second scanner pair receiving the second laser beam emitted by the second laser oscillator and deflecting the incident second laser beam to a desired location on the substrate to be processed;
a scan lens receiving laser beams that have been deflected from the first and second scanner pairs, focusing the received laser beams to spots having predetermined diameters so as to radiate spots on the substrate; and shuttle units each comprising a beam blocking unit for entirely blocking an incident laser beam, a beam transmitting unit for entirely allowing an incident laser beam to be transmitted, and a transport means for changing a location of one of the beam blocking unit and the beam transmitting unit so that the laser beam is incident upon one of the beam blocking unit and the beam transmitting unit.

* * * * *